United States Patent [19]

Payne et al.

[11] Patent Number: 5,508,894
[45] Date of Patent: Apr. 16, 1996

[54] BOAT TRAILER LIGHT ASSEMBLY

[75] Inventors: Duncan M. Payne, Tulsa; Ralph E. Schrader, Jr., Muskogee, both of Okla.

[73] Assignee: Optronics, Inc., Fort Gibson, Okla.

[21] Appl. No.: 491,563

[22] Filed: Jun. 16, 1995

Related U.S. Application Data

[63] Continuation of Ser. No. 228,158, Apr. 15, 1994, abandoned.

[51] Int. Cl.$^6$ ........................................................ B60Q 1/26
[52] U.S. Cl. .............................. 362/61; 362/833; 362/267; 362/268
[58] Field of Search ............................... 362/61, 80, 83.3, 362/158, 267, 268, 310, 362, 368, 369

[56] References Cited

U.S. PATENT DOCUMENTS

| | | | |
|---|---|---|---|
| 1,133,536 | 3/1915 | Chase | 362/267 |
| 3,115,307 | 12/1963 | Dickson | 362/267 |
| 4,380,793 | 4/1983 | Potts | 362/267 |
| 4,445,165 | 4/1984 | Sherwood | 362/376 |
| 4,617,617 | 10/1986 | Cunningham et al. | 362/267 |
| 5,060,121 | 10/1991 | Cunningham et al. | 362/61 |
| 5,136,484 | 8/1992 | Eaton et al. | 362/61 |
| 5,150,959 | 9/1992 | Paffrath et al. | 362/80 |
| 5,295,054 | 3/1994 | Baader et al. | 362/267 |

*Primary Examiner*—James C. Yeung
*Assistant Examiner*—Y. Quach
*Attorney, Agent, or Firm*—Head, Johnson & Kachigian

[57] ABSTRACT

A vehicular submersible lamp assembly comprising an external housing, with an integral bulb fixture molded to the external housing, an internal enclosure which is designed to form a watertight compartment about the light bulb assembly by use of a gasket and post mounting means internal to the watertight light bulb enclosure. Wiring for the lamp assembly enters the watertight internal enclosure by means of an aperture which is sealed with encapsulant. The assembly allows for replacement of light bulbs while maintaining the watertight integrity of the light bulb compartment.

1 Claim, 3 Drawing Sheets

BOAT TRAILER LIGHT ASSEMBLY

This is a continuation of application Ser. No. 08/288,158 filed on Apr. 15, 1994, now abandoned.

BACKGROUND OF THE INVENTION

Boat trailer lights are typically submerged in water during launch and retrieval of boats. If water enters the lamp assembly it may cause the bulbs to shatter due to the temperature difference between the glass and the water or it may cause corrosion in the contacts of the fixture on the bulb or both, thus, resulting in a subsequent failure.

In order to overcome this problem, various methods have been tried. Some have utilized the air entrapment principle, where one end of the housing for the bulb is sealed and the other is open allowing water to enter. During launch the rising water compresses the air and prevents the water from contacting the bulb. These methods often fail as the water will slosh about during motion of the trailer on rough ramp surfaces. U.S. Pat. Nos. 3,106,349, 3,858,038, 4,617,617 and 5,136,484.

Others have described a bulb compartment which is permanently sealed to prevent water access, but such do not allow bulb replacement. U.S. Pat. Nos. 5,060,121 and 5,150,954.

Another method which allows bulb replacement and yet allows for a water-tight enclosure is to use flexible gaskets to ensure a tight seal. These methods have encountered problems when bulbs are replaced by the user due to the necessity of ensuring that the seal not be broken around the mounting means. The current invention is an improvement in the above method as it provides for a mounting means apart from the gasket, thus ensuring a water-tight bulb compartment upon replacement of the bulbs.

With the existing gasket sealed enclosures the fastening means require a watertight seal. The present invention is such that the internal enclosure which completes the water-tight compartment about the bulb fixture has one continuous surface at its bottom edge. The fastening means do not require separate gasket to maintain the watertight compartment about the bulb fixture.

SUMMARY OF THE INVENTION

The invention describes a submersible light fixture for use with a vehicle such as a boat trailer or in other uses where the light fixture may be under water.

The fixture consists of a housing to be mounted on the vehicle or trailer. The housing is designed to be open on two sides. One of the open sides is covered by the lens which would normally face outward and which would transmit the light for following traffic. The other open side at one end of the housing is covered by another lens which would form the side marker, thus, allowing one standing to the side of the trailer to see the light.

Within the housing is mounted the light fixture holding the bulb or bulbs and the wires necessary to power the bulbs. The light fixture is enclosed in a clear plastic cover. When the clear plastic cover is properly secured with a gasket to the main housing it forms a water-tight compartment for the light bulbs. The entire internal assembly is within the outer housing which is completely enclosed when the lenses are properly mounted.

The opening through which the wires enter the external housing through the rear or bottom portion of the housing is sealed by encapsulating silicone or other sealants such as to maintain the water-tight integrity of the internal bulb compartment.

When the entire assembly is submerged, such as in boat launching or retrieval operation, some water may penetrate the external housing but will not penetrate the internal water-tight compartment enclosing the bulbs and the wiring contacts.

DETAILED DESCRIPTION OF THE EMBODIMENTS

Figure 1:
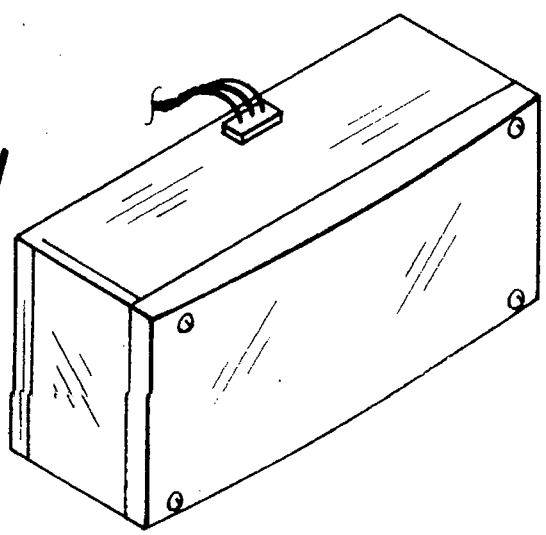
FIG. 1 is an isometric view of the assembled light fixture of the present invention, shown resting on one side.

FIG. 1 illustrates a submersible trailer light assembly. The assembly is intended to be mounted on vehicular trailers particularly boat trailers which may be submerged during launching and retrieval of the boat.

Figure 2:
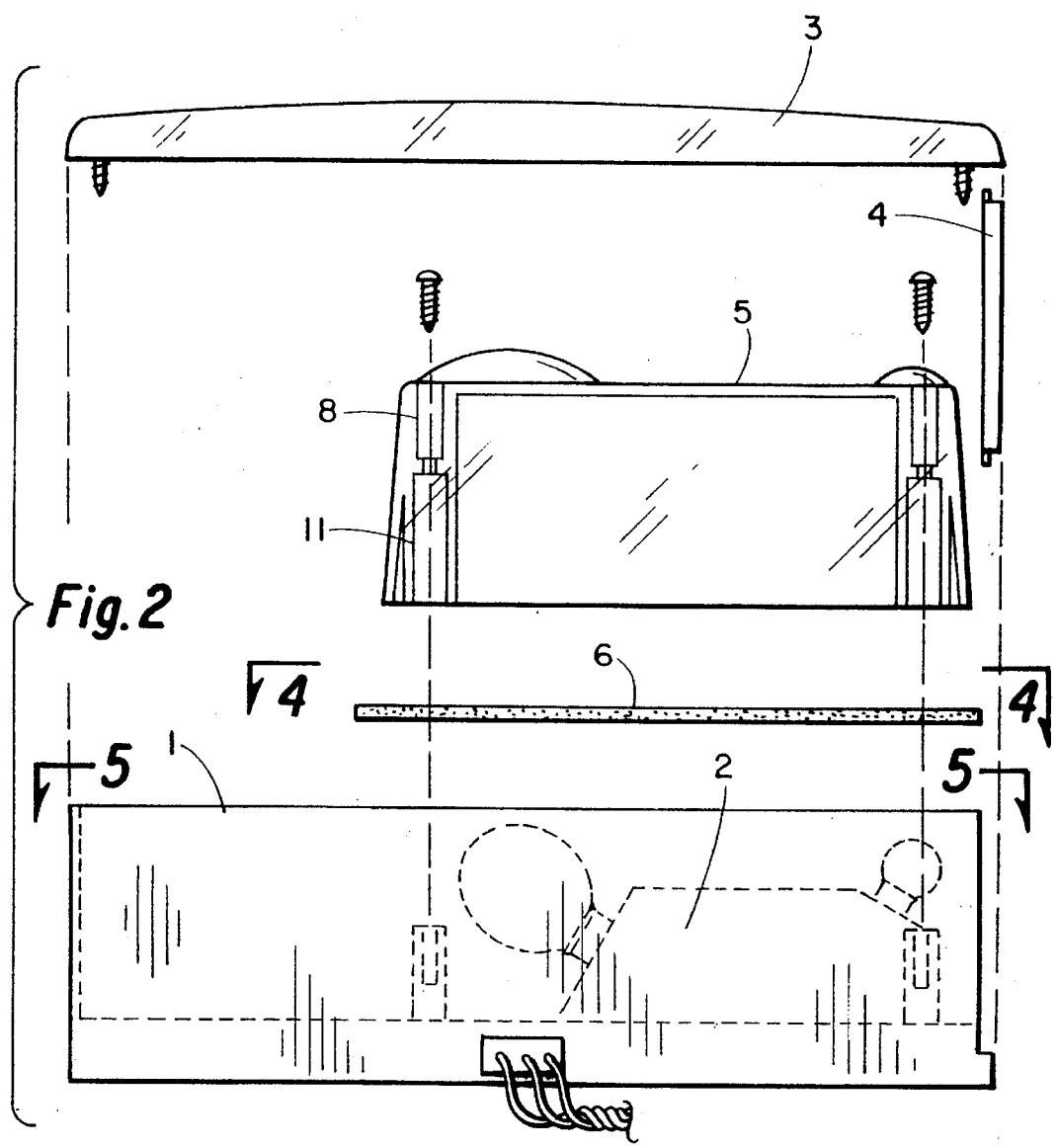
FIG. 2 is an exploded view of the invention with the removable parts disassembled.

In the exploded view of the assembly, FIG. 2, we see that the assembly consists of an external housing 1 made of molded plastic material to which is permanently attached the bulb fixture 2. The housing is covered by plastic lenses, typically red for a tail light assembly. There are two lenses, a lens 3 to allow light towards the rear of the trailer when the assembly is mounted, and a lens to allow light to the side of trailer 4.

The bulb fixture is covered by a specially designed clear plastic internal enclosure 5 enclosing it in a water-tight space 14 by use of the gasket 6.

Figure 5:
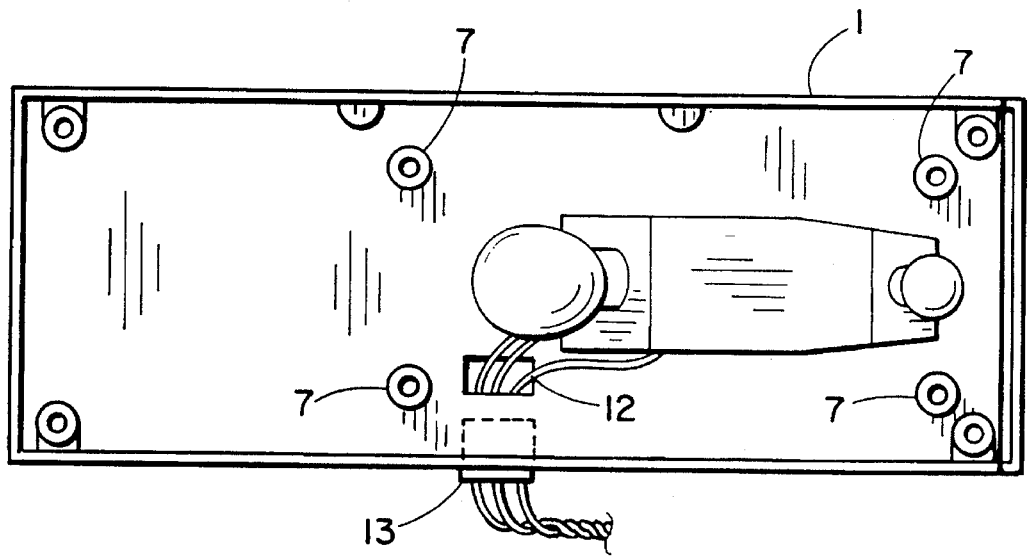
FIG. 5 is a top view of the external housing as taken along 5—5 of FIG. 2.

FIG. 5 shows a plan view of the light fixture assembly with both the internal enclosure and the gasket removed, such that the bulb housings and electrical conduits are seen. The plastic internal enclosure 5 is intended to be mounted over four cylindrical posts 7. The posts are molded as part of the external housing. The outside diameter of the posts 7 is such as to provide close tolerance to the internal cover mounting wells 11.

Figure 3:
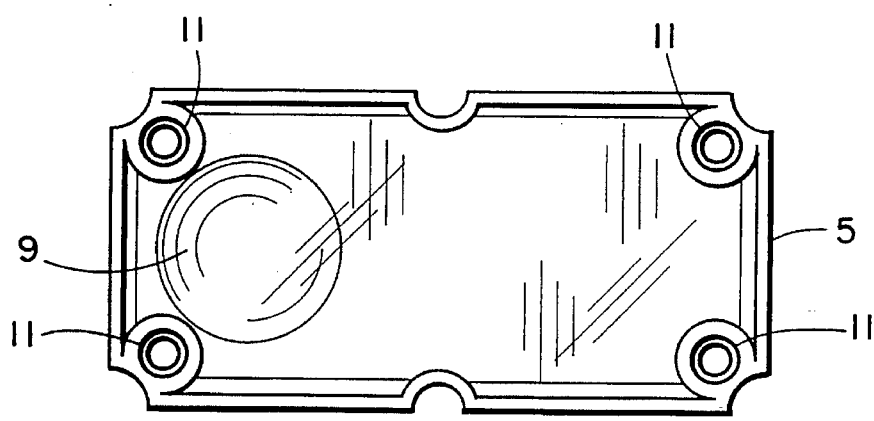
FIG. 3 is a bottom view of the inside lamp housing as taken along 3—3 of FIG. 2.
Figure 4:
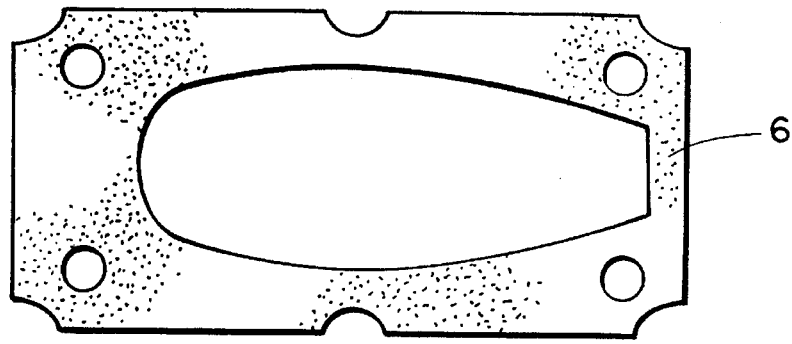
FIG. 4 is a top view of the gasket as taken along the line 4—4 of FIG. 2.

FIG. 3 shows a cross-sectional view of the internal enclosure along the line 3—3 of FIG. 2. The enclosure 5 is provided with four cylindrical wells or openings 11 which mount over the four cylindrical mounting posts 7. On the top side of the internal enclosure are four cylindrical wells 8 which provide a space for fasteners typically threaded to attach the internal enclosure 5 to the mounting posts 7 of the external housing 1. Although the design of the internal enclosure 5 is such that when installed it will form a watertight compartment for the bulbs, the plurality of fasteners are to ensure that the enclosure 5 does not lose its watertight integrity due to prolonged vibration of the light fixture while mounted on the vehicle in transit.

The internal enclosure is made of clear plastic to allow light to pass through. The top is provided with two curved lens areas to maximize the light transmission from the two bulbs, and to minimize scattering of said light.

Looking at the bottom of the internal enclosure as shown in FIG. 3, we see that the internal enclosure forms a continuous planar surface around all four sides of its outside periphery.

Figure 7:
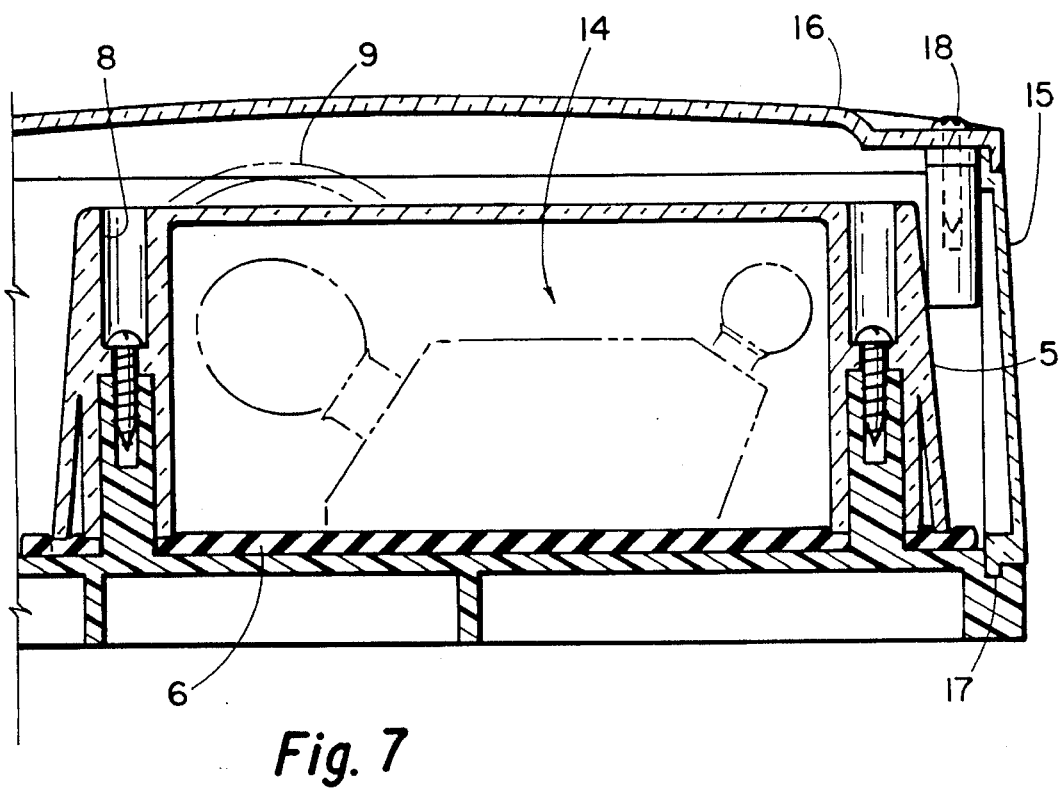
FIG. 7 is a partial, enlarged cross-section view along lines 7—7 of FIG. 6, showing the outside lenses installed.

The four spaces 11 are the wells or openings that fit over the four posts 7, which are molded as integral parts of the external housing. The vertical height of the four posts 7, is slightly less than the depths of the four wells 11 in the internal enclosure such that when the internal enclosure is placed over the posts 7, it will penetrate all the way and press firmly against the gasket 6 to make a watertight seal as shown in FIGS. 2 and 7.

Partially removed from each of the four outer corners of the top of the internal enclosure and toward the center thereof, are four wells 8; these are located vertically above the four wells 11 identified in FIG. 3. Between each of the opposite wells is a traverse surface through which is drilled or molded a small hole to allow the passage of a threaded fastener. The fastener in turn threads into a counter bored threaded hole in the external housing post 7. In the embodiment of this invention no gasket is required about the fasteners.

Electrical wires from the bulb socket pass through an opening 12 in the external housing 1. The wires are preassembled to pass through a resilient plastic stopper 13 which, when inserted into an opening in the external housing complete the water-tight seal between bulb compartment 14 and internal enclosure 5. In the alternative, a sealant resin may be used to ensure that the electrical wires do not cause a loss of the water-tight integrity of the enclosure space 14.

With the internal enclosure securely in place, the external housing is covered by a side lens cover 15, which slides into a slot 17 in the external housing. The top of the fixture is covered by another lens cover 16 which is affixed to the external housing by a plurality of fasteners, such as four threaded fasteners 18. The top lens cover 16 also serves to hold the side lens 15 in place.

Figure 6:
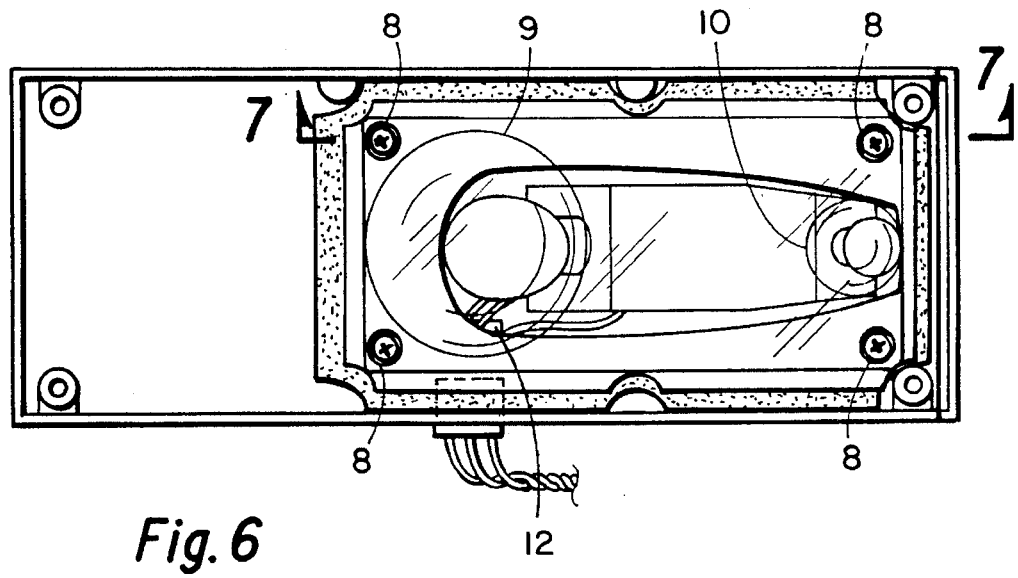
FIG. 6 is a top view of the light fixture with the gasket and internal housing in place, but outside lenses removed.

FIG. 7 shows the cross-section view of the assembled light fixture along line 7—7 of FIG. 6.

Stopper 13 is shown in the side of housing 1, however the opening 12 for conductors may equally as well be placed in the back wall of the housing.

Since the mounting posts are inside of the outer wall of the internal housing, the outer wall of said internal housing serves as a complete water-tight seal around the full periphery of the bulb enclosure. The fasteners are used to tighten and press the internal housing against the flexible gasket to maintain the seal. The design of the mounting posts and corresponding mating openings in the internal cover prevent any water penetration in or about the fastening means. Furthermore, there is no need for gaskets around the fasteners means.

The outer housing may be provided with grooved slots (not shown) to allow for mounting to a bracket on the trailer or with use of a bracket adapter.

The invention provides an improved submersible light assembly in which the bulbs and electrical connectors are within a water-tight compartment. The assembly allows for replacement of the bulbs when necessary and upon reassembly the unit will again be water-tight.

Various modes of carrying out the invention are contemplated as being within the scope of the following claims particularly pointing out and distinctly claiming the subject matter which is regarded as the invention.

What is claimed is:

1. A submersible lamp assembly comprising:

an external housing having a base, an open top and four sides, said base and sides having an inside and an outside surface and having a plurality of spaced apart mounting posts extending uprightly from the base inside surface and within said sides, each said post having a threaded recess therein;

a fixture having at least one bulb retaining socket mounted to said inside surface of said base of said external housing, each socket having a bulb removably retained therein;

means for sealably passing electrical conductors through said base of said external housing, the electrical conductors being attached to said fixture;

an internal enclosure having a transparent top surface, four sides, a recess for receiving each of said mounting posts and a planar lower edge, the lower edge surrounding each of said recesses, the internal enclosure being positioned within said external housing, said recesses receiving said mounting posts, the internal enclosure having an opening in alignment with each said recess;

a planar water resistant gasket positioned on said inside surface of said base of said external housing and around said fixture and surrounding each of said mounting posts, the gasket being sealably engaged by said internal enclosure planar lower edge to thereby seal around each of said recesses and said internal enclosure sides, said internal enclosure being thereby sealed against said inside surface of said external housing base;

a bolt extending through each said opening in said internal enclosure and threadably engaging each said post threaded recess whereby said internal enclosure is removably attached to said inside surface of said external housing base; and a removable lens cover mounted on and closing said open top of said external housing through fastening means said lens cover, when removed exposing said internal enclosure which may be removed by removing said fastening means and said bolts to permit replacing said bulb or bulbs.

* * * * *